W. H. McKENZIE.
VALVE TESTING MACHINE.
APPLICATION FILED OCT. 10, 1918.

1,298,236.

Patented Mar. 25, 1919.
3 SHEETS—SHEET 1.

Inventor
W. H. McKenzie
By Lacey & Lacey Attorneys

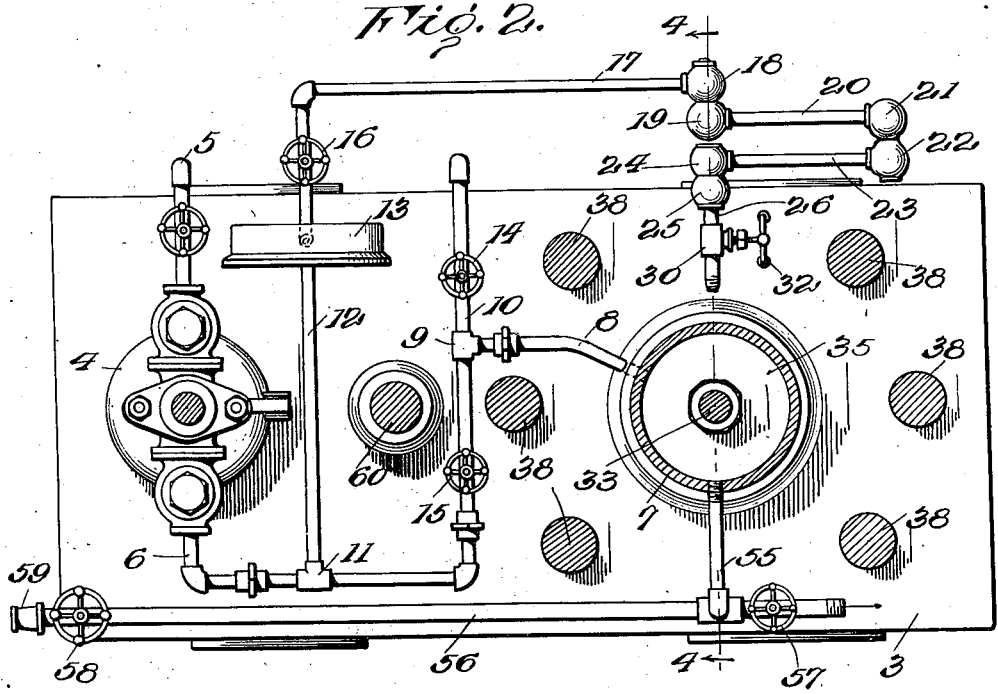
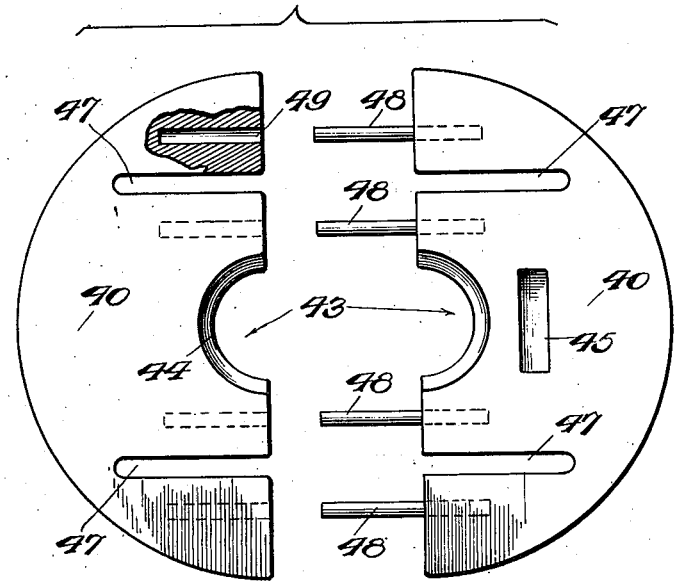

W. H. McKENZIE.
VALVE TESTING MACHINE.
APPLICATION FILED OCT. 10, 1918.
1,298,236.
Patented Mar. 25, 1919.
3 SHEETS—SHEET 3.
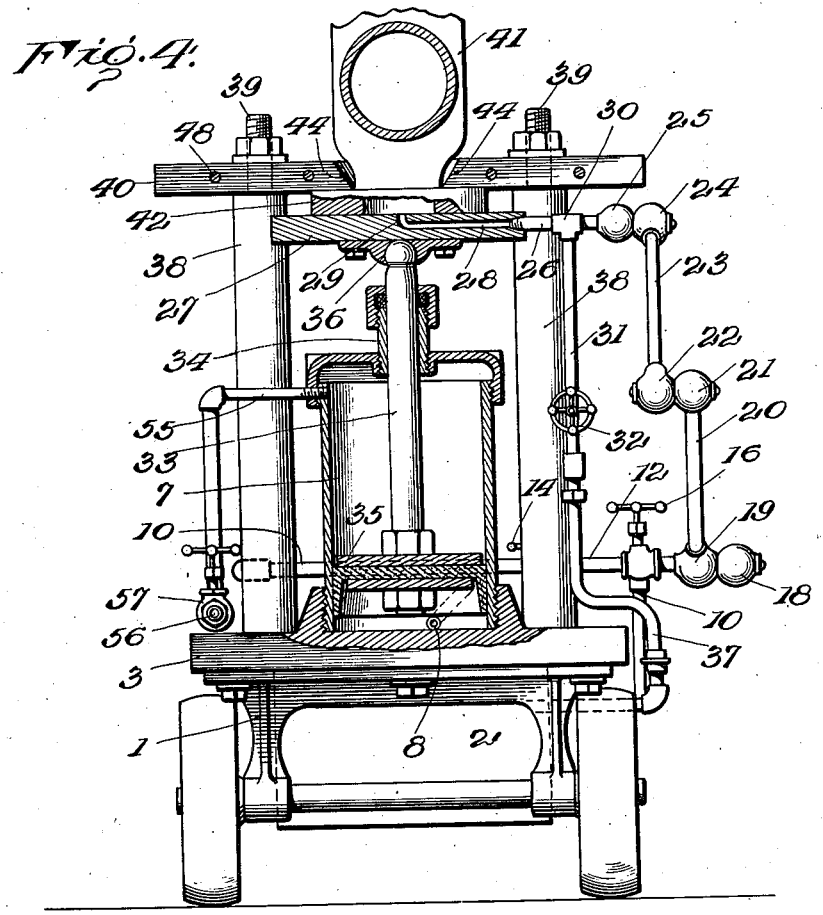
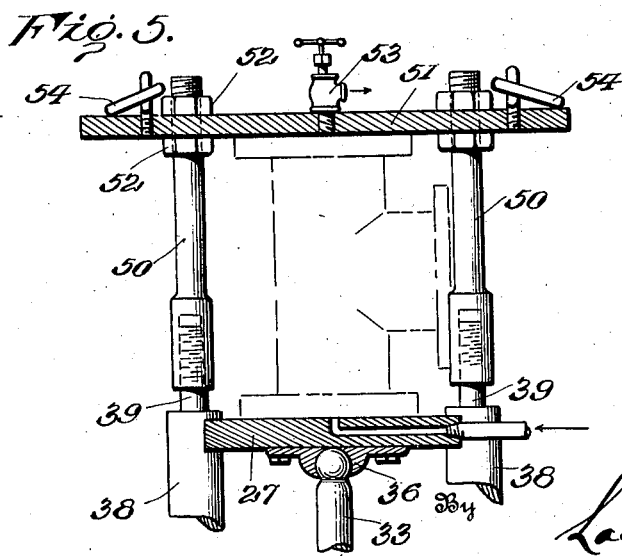
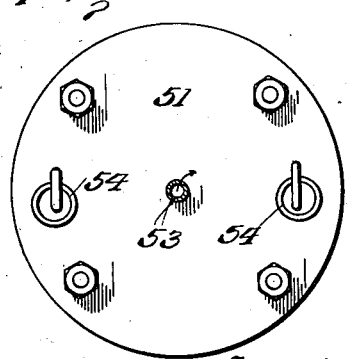
Inventor
W. H. McKenzie.
By Lacey & Lacey, Attorneys

UNITED STATES PATENT OFFICE.

WILLIAM H. McKENZIE, OF OAKLAND, CALIFORNIA.

VALVE-TESTING MACHINE.

1,298,236.  Specification of Letters Patent.  Patented Mar. 25, 1919.

Application filed October 10, 1918. Serial No. 257,605.

*To all whom it may concern:*

Be it known that I, WILLIAM H. MCKENZIE, a citizen of the United States, residing at Oakland, in the county of Alameda and State of California, have invented certain new and useful Improvements in Valve-Testing Machines, of which the following is a specification.

This invention seeks to provide a simple, efficient and easily operated apparatus whereby valves for water mains or similar conduits and elbow fittings for use in connection with said conduits may be readily tested for leakage. The invention seeks to provide a machine in which the valve casing or the elbow fitting may be quickly secured in position to be tested without imposing manual strain upon the operator, and the invention also seeks to improve generally the construction, arrangement and operation of the parts of a machine for the stated purpose.

An embodiment of the invention is illustrated in the accompanying drawings, in which—

Figure 1 is a side elevation of an apparatus constructed in accordance with the invention;

Fig. 1ª is a detail view of the upper end of the crane appearing in Fig. 1;

Fig. 2 is a view partly in plan and partly in horizontal section;

Fig. 3 is a plan view, partly broken away of the clamping plates employed for securing a valve body in position to be tested;

Fig. 4 is a view partly in end elevation and partly in transverse section, the plane of the section being indicated by the line 4—4 in Fig. 2;

Fig. 5 is a detail sectional view showing the manner of securing an elbow fitting in position to be tested;

Fig. 6 is a plan view of the upper clamping plate shown in Fig. 5.

Figure 1:
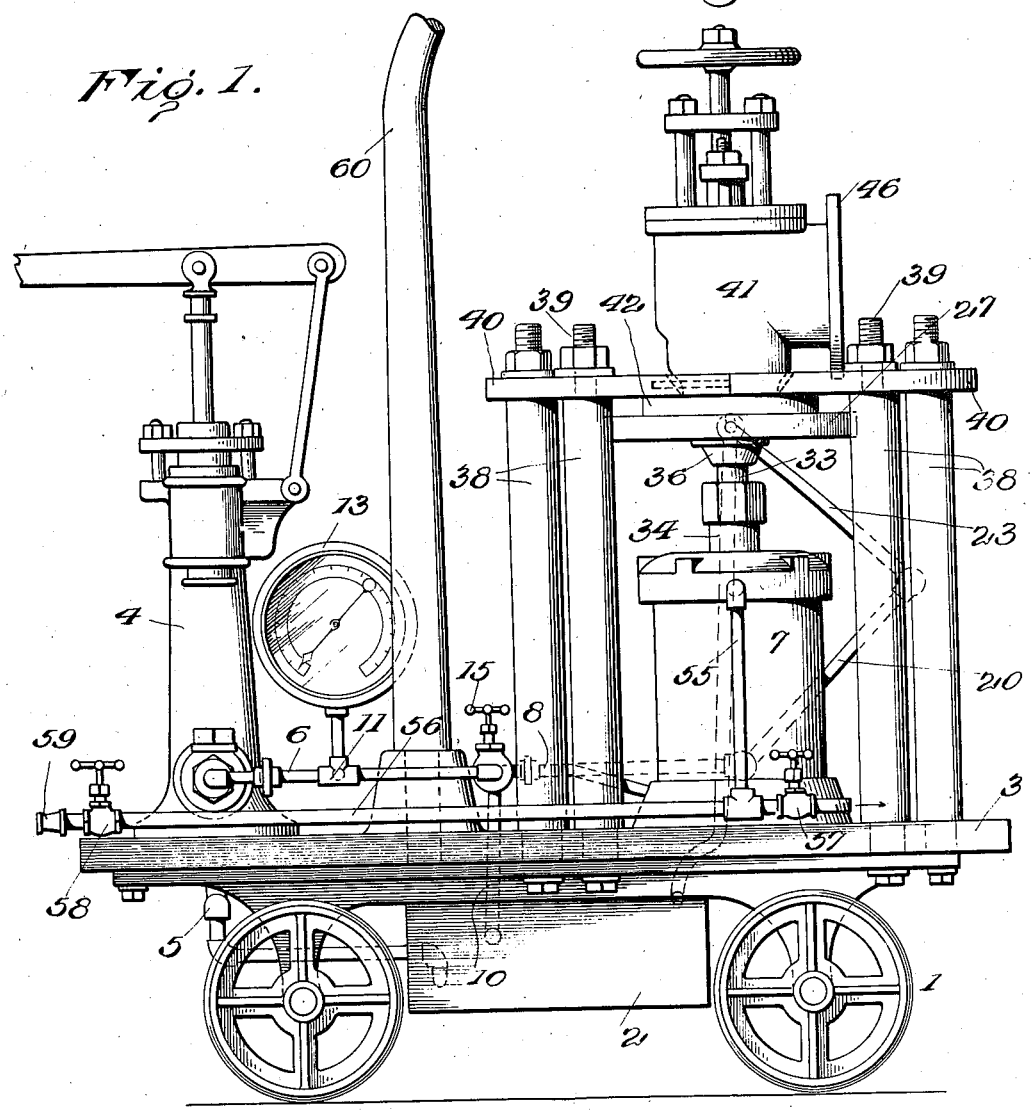
Figure 1A:
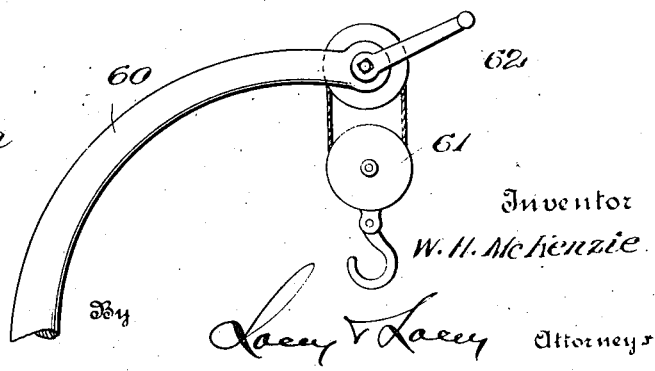

In carrying out my invention, I preferably mount the operating parts upon a truck 1 so that the apparatus may be readily transported from place to place but the mechanism may, of course, be stationary and in some instances a stationary apparatus may be preferable. In the illustrated embodiment of the invention, a reservoir 2 is secured below the platform 3 of the truck and may be of any dimensions according to the size of the particular machine in connection with which the same is to be used. It should in all instances be large enough to contain a supply of water sufficient to operate the lifting piston and to fill the fitting to be tested. When the apparatus is stationary, the tank may be omitted and the operating parts connected with a water supply main or other source of fluid under pressure. It is to be understood that other minor changes may be made in the apparatus without involving a departure from the invention as the same is defined in the claims appended hereto, and the invention is not limited to the particular details illustrated in the accompanying drawings and specifically mentioned in the following description.

In the arrangement illustrated, a pump 4 is mounted upon the platform at one end thereof and the inlet end of said pump is connected by a pipe 5 with the reservoir or tank 2 so that upon operation of the pump, which may be of any well-known type, water will be drawn from the pump and driven through the outlet pipe 6 to the lifting piston and to the fitting to be tested. At the opposite end of the platform is mounted a cylinder 7 to which water is supplied through a pipe 8 leading into the lower end of the cylinder. This pipe 8 is connected by a T-coupling 9 to a transverse pipe 10 which at one end leads into the reservoir or tank 2 and at its other end is connected by a T-coupling 11 with the outlet pipe 6 from the pump and a branch pipe 12 which extends across the platform and carries a pressure gage 13. The pipe 10 is provided with a cut-off valve 14 between the pipe 8 and the tank and with a similar cut-off valve 15 between the said pipe 8 and the coupling 11. The pipe 12 extends laterally beyond the pressure gage 13 and the adjacent side of the platform and is equipped with a cut-off valve 16 beyond which it is carried longitudinally or parallel with the platform, as shown at 17, to a point approximately in the transverse plane of the cylinder 7 where it is equipped with one member 18 of a swivel or turning joint, the other member 19 of said joint being secured upon the end of a pipe 20 which at its opposite end carries one member 21 of a similar swivel joint. The coöperating member 22 of the last-mentioned swivel joint is carried by the lower end of a pipe 23 to which, at its upper end, is secured one member 24 of a third swivel joint, the coöperating member 25 of which is secured upon the outer end of a pipe 26 which leads to the head plate 27 upon which the fitting to be tested is supported. The said head plate is provided with a bore 28 which communicates directly with the pipe 26 and at its inner end is turned upwardly, as shown at 29, to open through the upper surface of the head plate at the center of the same. Intermediate the swivel joint member 25 and the head plate, a T-coupling 30 is interposed in the pipe 26 and connected with said T-coupling is a drain pipe 31 which extends downwardly past the platform and discharges into the tank 2, the said drain pipe being provided intermediate its height at any convenient point with a cut-off valve 32. The head plate is mounted upon the upper end of a piston rod 33 which extends slidably through a gland 34 on the head of the cylinder 7 and has its lower end secured in a piston or plunger 35 which is mounted within the cylinder 7, as clearly shown in Fig. 4. The head plate is connected with the upper end of the piston rod 33 by a ball and socket joint 36 so that the head plate may readily accommodate itself to the possible shifting angular relation of the piston rod and the pipes 20 and 23 in the operation of the apparatus and may also accommodate possible variations in the finish of the fitting to be tested so that under all circumstances a water-tight joint will be effected between the head plate and the fitting. It will be understood that the pipe 26 follows the vertical movement of the head plate and the swivel joints shown and described are provided to attain the requisite flexibility in the connection between the pipes 17 and 26, and to accommodate the consequent movement of the pipe 31 relative to the tank, a hose 37 is utilized to establish communication between the said pipe and the tank.

Posts 38 are erected upon the platform in concentric spaced relation to the cylinder 7 and the outermost of these posts, or those posts nearest the side edges of the platform, are provided with reduced threaded extensions 39. Clamping plates 40 are supported upon the upper ends of these posts and are adapted to fit over the lower end flange of the fitting so that said flange will be clamped between the said plates and the head plate 27. In Figs. 1 and 4, a valve 41 is illustrated in position to be tested and the lower flange of this valve is indicated at 42. It will be noted that the flange rests directly upon the head plate and its upper surface bears directly against the under surfaces of the clamping plates which fit close to the body portion of the valve. By referring more particularly to Fig. 3, it will be noted that the clamping plates are substantially semi-circular in plan view and are provided at the centers of their straight edges with semi-circular notches 43 which are adapted to fit around the body of the valve casing, the edges of these notches being beveled, as shown at 44, so as to accommodate the tapered surface of the valve body. One of these plates is provided with a recess 45 in its upper surface to accommodate the flange 46 of the lateral branch of the valve and both plates are provided in their inner edges with the open-ended slots or notches 47 which permit the plates to be slid across the upper ends of the posts 38 past the threaded extensions 39. One clamping plate 40 is provided at its inner edge with dowel pins 48 adapted to engage mating recesses 49 in the corresponding edge of the other clamping plate so as to insure the proper coaction of the plates.

When an elbow fitting is to be tested, the clamping plates 40 are not employed and extension rods 50 are fitted upon the threaded extensions 39 of the posts 38, a clamping plate 51 being secured upon the upper ends of these extension rods in any desired manner, as by nuts 52 secured upon the rods above and below the plates, as illustrated in Fig. 5. This clamping plate 51 is equipped at its center with a valve-controlled vent 53 so that, when the fitting is in position, the valve may be opened and an escape for the air trapped within the fitting thereby provided. At diametrically opposite points of the clamping plates, rings 54 or other convenient form of handles are provided so that the plate may be readily lifted from the extension rods or mounted thereon.

Communicating with the upper end of the cylinder 7 is an air pipe 55 leading from a main supply pipe 56 mounted in any convenient manner upon the platform. This main pipe 56 is equipped with cut-off valves 57 and 58 at opposite sides of the pipe 55 and at one end is equipped with a nozzle or fitting 59 to facilitate the coupling thereto of a hose leading from any convenient source of compressed air supply.

To facilitate the placing of the fitting upon the head plate and the removal of the same therefrom, I mount a crane 60 upon the platform between the pump 4 and the cylinder 7 and this crane carries a block and tackle mechanism, indicated at 61, at its upper end, said block and tackle being operated by a crank 62 or other convenient means. The particular construction of the crane and the particular construction of the pump 4 are not parts of my invention and these elements of the apparatus may be of any well-known type.

It is thought the operation of the mechanism will be readily understood. When a valve is to be tested, the valve body is placed in position upon the head plate 27 with the inlet opening of the valve concentric with the end 29 of the bore 28 in the said head plate, the head plate being then in its lowest position. In this position of the parts, the valve 58 will be closed and the valve 57 open. The valves 14, 16 and 32 will also be closed and the valve 15 will be opened. After the valve has been properly positioned upon the head plate, the pump 4 will be operated to draw water from the reservoir and this water will flow through the pipes 10 and 8 into the lower end of the cylinder 7 and act upon the piston 35 so as to lift the same, this lifting movement of the piston being transmitted through the rod 33 to the head plate and the valve body 41 so that the said valve body will be brought to the testing position. When the head plate has reached the upper limit of its movement the valve 15 is closed so as to maintain the pressure in the cylinder 7. The clamping plates 40 are then pushed inwardly so that their inner edges will meet around the valve body and over the flange 42 of the same and if the flange should not be firmly secured between the head plates and clamping plates, the valves may again be opened and the pump operated so as to raise the piston and the head plate an additional distance sufficient to secure the valve body against movement after which, of course, the valve 15 will be again closed. The valve 16 will then be opened and the pump again operated so as to force water through the pipes 17, 20, 23 and 26 into the head plate and through the bore of the same into the interior of the valve body 41, it being understood, of course, that the outlet of the valve or the outlet of the elbow fitting, in case an elbow fitting is being tested, will be effectually sealed before the testing operation begins. The gage 13 indicates the pressure to which the water flowing into the fitting is subjected by the action of the pump 4 so that if the fitting should develop a crack or other form of leak, it may be readily noted what pressure the fitting will sustain without serious leakage and if no leakage is discovered up to the capacity of the gage it may generally be rated as a perfect fitting. The machine built by me has a capacity of one thousand pounds pressure which is at least equal to the pressure to which any ordinary fitting is normally subjected. The fitting may be connected during the entire time it is in position upon the apparatus with the crane 60 and the clamping plates 40, of course, moved into position around the fitting before the head plate is raised so that it is not necessary to disconnect the fitting from the crane to conduct the testing operation and then again connect the fitting with the crane after being tested in order that it may be removed. The test being completed, the valve 16 is closed and the valve 32 opened so that the water within the fitting may drain back into the tank. After the water has been drained from the fitting, the valve 14 is opened to permit the water in the cylinder to drain back into the tank and the descent of the piston and the head plate will be facilitated by closing the valve 57 and opening the valve 58 whereupon air under pressure will be admitted to the top of the cylinder above the piston 35 and act on the piston to lower the same.

An elbow fitting or other form of coupling is tested in the same manner as a valve is tested except that the clamping plates 40 are not used and the plate 51 is substituted, the said plate 51 serving as a closure for the upper end of the fitting as will be readily understood upon reference to Fig. 5, and the pressure exerted upon the head plate and through the head plate upon the fitting should be sufficient to effect a water-tight engagement between the ends of the fittings and the head plate and clamping plate 51, respectively. After the fitting has been secured in place, the valve 53 is opened so that as the water enters the fitting the trapped air may readily escape.

My improved apparatus is very compact, is simply constructed and is strong and durable. In using the same, it is not necessary to manipulate a large number of bolts in order to secure the fitting to be tested in position and a large number of fittings or valves may be consequently thoroughly tested in a very short period of time.

Having thus described my invention, what is claimed as new is:

1. In an apparatus for the purpose set forth, the combination of a head plate adapted to support a fitting to be tested, means for raising and lowering said plate and maintaining the plate in its elevated position, and flexible means for conveying fluid under pressure through the head plate to the fitting and withdrawing said fluid therefrom.

2. In an apparatus for the purpose set forth, the combination of a head plate adapted to support a fitting to be tested, hydraulic means for raising said plate and maintaining it in an elevated position, and extensible means for supplying liquid under pressure through said head plate to the fitting and withdrawing said liquid therefrom.

3. In an apparatus for the purpose set forth, the combination of a head plate adapted to support a fitting to be tested, a cylinder disposed below said plate, a piston in said cylinder, a piston rod rising from the piston through the head of the cylinder and removably coupled to the under side of the head plate, means for admitting fluid pressure to the cylinder below the piston and withdrawing said fluid therefrom, and extensible means for supplying liquid under pressure through the head plate to the fitting.

4. In an apparatus for the purpose set forth, the combination of a cylinder, a head plate disposed above the cylinder, a piston within the cylinder, means for admitting liquid under pressure to the cylinder below the piston, a piston rod rising from the piston and carrying the head plate, means for admitting fluid under pressure to the cylinder above the piston, and extensible means for admitting liquid under pressure through the head plate to the fitting to be tested.

5. In an apparatus for the purpose set forth, the combination of a head plate adapted to support a fitting to be tested and constructed with a radial bore opening at one end through the edge of the plate and at its opposite end through the upper side of the plate at the center of the same, hydraulic means for raising the head plate and holding it in a raised position, a pipe communicating with the outer end of the bore in the head plate, a drain pipe leading from said first-mentioned pipe, a series of pipes having swiveled connection with each other and with said first-mentioned pipe, and means for forcing liquid under pressure through said pipes to the bore of the head plate and through said bore to the fitting.

6. In an apparatus for the purpose set forth, the combination of a cylinder, a piston therein, a head plate supported from said piston and provided with a radial bore opening through the top of the plate and the edge of the same, respectively, a pump, valved connections between the pump and the lower end of the cylinder, and valved connections between the pump and the bore of the head plate.

7. In an apparatus for the purpose set forth, the combination of a plurality of posts, clamping plates mounted upon said posts, and provided in their opposed edges with notches to engage around a fitting, a head plate adapted to support the fitting, hydraulic means for raising said head plate to secure the fitting against the clamping plates, and means for supplying liquid under pressure through said head plate to the fitting.

8. In an apparatus for the purpose set forth, the combination of a plurality of posts having reduced extensions at their upper ends, clamping plates mounted upon the upper ends of the posts and slidable across the same and provided with notches in their meeting edges to accommodate said extensions, said clamping plates being provided at the centers of their inner edges with notches to engage around the body of a fitting, a head plate adapted to bear against the lower end of the fitting, means for forcing the head plate against the fitting, and means for supplying liquid under pressure through the head plate to the fitting.

In testimony whereof I affix my signature.

WILLIAM H. McKENZIE. [L. S.]